(12) United States Patent
Zhang

(10) Patent No.: US 8,401,804 B2
(45) Date of Patent: Mar. 19, 2013

(54) TRIGGER CIRCUIT FOR LOW-POWER STRUCTURAL HEALTH MONITORING SYSTEM

(75) Inventor: Chang Zhang, San Jose, CA (US)

(73) Assignee: Acellent Technologies, Inc., Sunnyvale, CA (US)

( * ) Notice: Subject to any disclaimer, the term of this patent is extended or adjusted under 35 U.S.C. 154(b) by 311 days.

(21) Appl. No.: 12/844,735

(22) Filed: Jul. 27, 2010

(65) Prior Publication Data

US 2012/0029842 A1 Feb. 2, 2012

(51) Int. Cl.
*G01B 5/28* (2006.01)
(52) U.S. Cl. .......................................... 702/39
(58) Field of Classification Search ............... 702/39, 702/117, 118, 182–185, 188
See application file for complete search history.

(56) References Cited

U.S. PATENT DOCUMENTS

2003/0033032 A1\* 2/2003 Lind et al. ...................... 700/52

\* cited by examiner

*Primary Examiner* — Edward Raymond
(74) *Attorney, Agent, or Firm* — Innovation Counsel LLP

(57) ABSTRACT

A trigger circuit for use with a structural health monitoring system. To save power, a structural health monitoring system is programmed with a sleep mode and a wake, or operational, mode. In its operational mode, the structural health monitoring system can perform its usual tasks, e.g. monitoring a structure and determining its structural health. In sleep mode, many functions are suspended, so that the system requires less power. The trigger circuit wakes the system when the sensors of the structural health monitoring system emit a sufficiently large signal, i.e. when an event occurs. That is, when not in use, the system enters sleep mode, and when some event occurs (e.g., impact, or some other stresses that are of concern), the trigger circuit alerts the system, prompting it to shift from sleep mode to operational mode and to begin taking/analyzing data.

19 Claims, 4 Drawing Sheets

TRIGGER CIRCUIT FOR LOW-POWER STRUCTURAL HEALTH MONITORING SYSTEM

This invention relates generally to structural health monitoring. More specifically, this invention relates to a trigger circuit for low-power structural health monitoring systems.

BACKGROUND

The structural health monitoring field often aims at carrying out the diagnostics and monitoring of structures using sensor arrays connected to associated hardware, such as dedicated analyzers. When connected to a computer, this hardware can allow users to determine the integrity of structures, often in or close to real time. In this manner, structural health monitoring systems and techniques can go beyond simple detection of structural failure to providing additional useful information such as early indications of damage.

However, structural health monitoring systems still suffer from drawbacks. For example, especially in "active" systems capable of generating relatively high voltage interrogating signals for querying or analyzing a structure, such systems often consume excessive amounts of electrical power. It is thus desirable to implement structural health monitoring systems that consume less power while still being able to effectively analyze, or determine the health of, structures.

SUMMARY

The invention can be implemented in a number of ways, such as by a system or a trigger circuit.

In one embodiment, a structural health monitoring system comprises a passive structural health monitoring system operable to monitor a structure to detect stress waves propagating in the structure. The passive structural health monitoring system comprises a plurality of sensing elements operable to generate signals corresponding to the detected stress waves, and a processor programmed with an operational mode and a sleep mode. The processor is operable in the operational mode to receive sensor signals corresponding to the signals generated by the sensing elements, and to perform at least one of processing the sensor signals and storing the sensor signals. The structural health monitoring system also includes a trigger circuit connected between the plurality of sensing elements and the processor. The trigger circuit is operable to receive the signals generated by the plurality of sensing elements, and to transmit a wake signal to the processor in response to receiving one of the signals with a voltage having a magnitude greater than a predetermined threshold. The processor is further operable to enter the operational mode from the sleep mode upon receiving the wake signal.

In another embodiment, a trigger circuit for changing modes in a structural health monitoring system comprises a circuit having a plurality of inputs and an output. The circuit is operable to simultaneously monitor each of the inputs for an input signal received from a structural health monitoring sensing element, and to transmit a wake up signal from the output when a voltage of the input signal exceeds a predetermined threshold. The wake up signal is operable to initiate a wake up process in the structural health monitoring system.

Other aspects and advantages of the invention will become apparent from the following detailed description taken in conjunction with the accompanying drawings which illustrate, by way of example, the principles of the invention.

BRIEF DESCRIPTION OF THE DRAWINGS

For a better understanding of the invention, reference should be made to the following detailed description taken in conjunction with the accompanying drawings.

Like reference numerals refer to corresponding parts throughout the drawings.

DETAILED DESCRIPTION OF EMBODIMENTS OF THE INVENTION

In one embodiment, the invention relates to a trigger circuit for use with a structural health monitoring system. To save power, a structural health monitoring system is programmed with a sleep mode and a wake, or operational, mode. In its operational mode, the structural health monitoring system can perform its usual tasks, e.g. monitoring a structure and determining its structural health. In sleep mode, many functions are suspended, so that the system requires less power. The trigger circuit wakes the system when the sensors of the structural health monitoring system emit a sufficiently large signal, i.e. when an event occurs. That is, when not in use, the system enters sleep mode, and when some event occurs (e.g., impact, or some other stresses that are of concern), the trigger circuit alerts the system, prompting it to shift from sleep mode to operational mode and to begin taking/analyzing data.

The trigger circuit has the ability to monitor multiple input channels with a short response time and low power consumption. The trigger circuit has a number of transistors and a comparator. A voltage supply applies a voltage to one input of the comparator, while the transistors govern application of a reference voltage to the other input of the comparator. The gate terminals of the transistors receive the output signals of the sensors, so that when the sensors detect an event, the resulting signals turn on one or more transistors, applying the reference voltage to the comparator. Detecting the change in voltage, the comparator outputs a trigger signal, waking up the structural health monitoring system.

The design of this trigger circuit allows for the continuous monitoring of numerous sensors with a single reference voltage. Furthermore, as the detection of a sensor signal relies on the switching on of a transistor, the response time of the trigger circuit is quite short. Trigger circuits of the invention thus provide a low power way to monitor multiple different sensors, with a quick response time that allows the structural health monitoring system to wake quickly, avoiding excessive loss of data. Additionally, the trigger circuit allows the system to safely enter sleep mode without fear of losing excessive data, thus providing an overall system that itself consumes less power.

Figure 1:
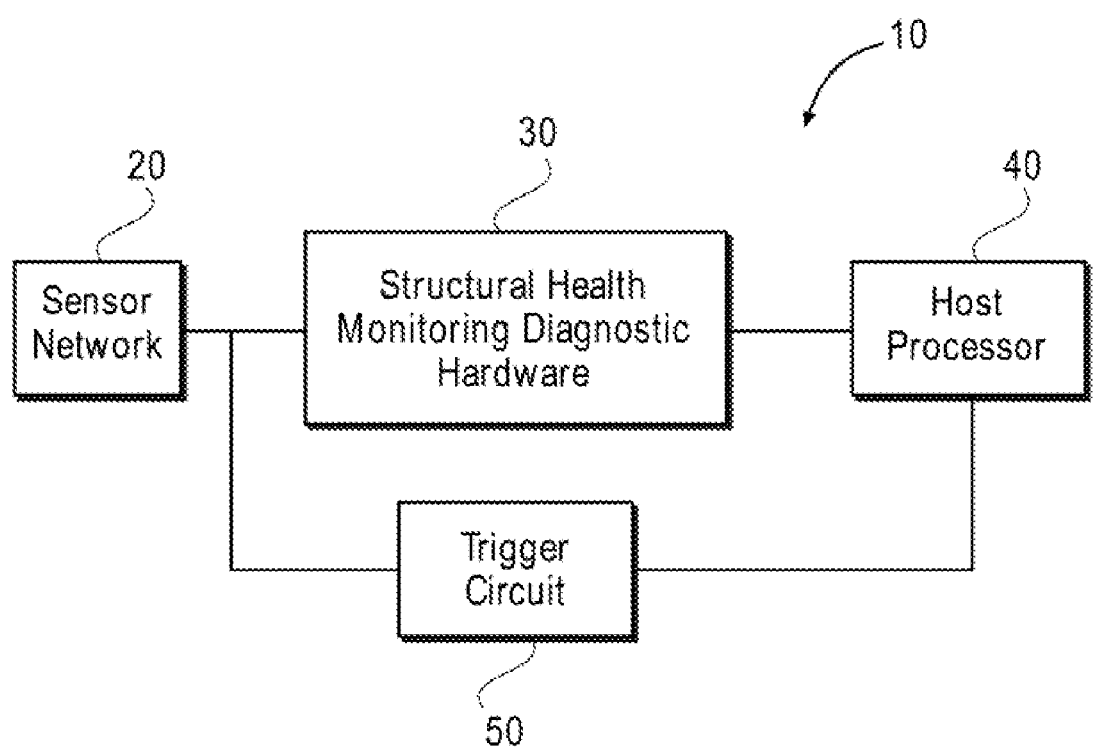
FIG. 1 is a block diagram representation of a structural health monitoring system incorporating a trigger circuit configured according to an embodiment of the invention.

FIG. 1 is a block diagram representation of a structural health monitoring system incorporating a trigger circuit configured according to an embodiment of the invention. In FIG. 1, a structural health monitoring system 10 includes a sensor network 20 which can be simply one or more sensing elements, structural health monitoring diagnostic hardware 30, a host processor 40, and a trigger circuit 50. The sensing elements are attached to a structure, so as to detect stress waves in the structure. The diagnostic hardware 30 and processor 40 together make up an analyzer that both actively and passively monitors the structure, as further described below. The analyzer also has two modes: an operational mode in which it can carry out the active/passive monitoring, and a sleep mode. The sensor network 20 is connected to both the diagnostic hardware 30 and the trigger circuit 50, so that both the diagnostic hardware 30 and trigger circuit 50 receive the sensor signals output from the sensing elements. If the analyzer is in sleep mode and the sensors detect an event such as an impact, the trigger circuit 50 detects the sensor signals and sends a trigger signal, i.e. a wake signal, to the processor 40. The processor 40 then wakes up from sleep mode, and can analyze the sensor signals to determine whether and/or how the impact has affected the structure.

The diagnostic hardware 30 and processor 40 can operate both actively and passively. The diagnostic hardware 30 can thus have both "active" and "passive" components. The active components transmit excitation signals to the sensing elements, generating diagnostic stress waves in the structure being monitored. These waves are picked up by neighboring sensing elements, and the resulting signals are analyzed to determine the health of the structure. In some approaches, differences between the signals sent to the sensing elements and those received back from other elements, or differences between received signals and a stored set of baseline data, can indicate damage to the structure.

In contrast, the passive components are not used to generate such interrogating waveforms. Rather, they passively monitor the structure, "listening" to detect stress waves generated in the structure by some event (e.g., an impact, or operation of the structure). When stress waves exceeding a specified threshold are detected, the system records/analyzes them to determine information such as whether an impact occurred, its location, and force.

It is often desirable to utilize both passive and active components in a single structural health monitoring system. However, one of ordinary skill in the art will realize that the system 10 need not necessarily employ both active and passive components, and can instead employ only a passive system or only an active system.

The system 10 can be constructed with the host processor 40 as part of a host device such as a desktop or portable computer, where the diagnostic hardware 30 is located on a plug-in peripheral or card. The system 10 can also be constructed with each of these components integrated into a single device. Embodiments of the invention contemplate any arrangement of diagnostic hardware 30 and processor 40.

The sensing elements of sensor network 20 can be any set of sensors and/or actuators capable of detecting and transmitting stress waves, respectively. Typically, a sensor network 20 includes multiple actuating and/or sensing elements placed at discrete locations on the structure, for transmitting stress waves through a structure and detecting resulting waveforms, respectively. As above, sensors can both passively monitor a structure for stress waves resulting from an impact (whereupon analysis of such stress waveforms can be performed to determine data about any corresponding damage), and monitor the structure for stress waves actively transmitted through the structure by the actuators (whereupon comparison of the resulting waveforms to the original signals transmitted can indicate damage). The invention contemplates use of any sensors and any actuators, affixed to a structure in any manner and any number that allow for evaluation of the structure. However, one suitable sensor/actuator is lead zirconate titanate (PZT) piezoelectric transducers (or any other suitable transducer) that each can act as both a sensor and an actuator. In known manner, each PZT transducer converts electrical signals to stress waves in order to actively query a structure, and converts resulting detected stress waves to electrical signals for analysis.

Furthermore, the sensors/actuators can be individually affixed to a structure, or affixed to a flexible diagnostic layer that can itself be affixed to a structure. This diagnostic layer and its operation are further described in U.S. Pat. No. 6,370,964 to Chang et al., which is hereby incorporated by reference in its entirety and for all purposes. Construction of the diagnostic layer is also explained in U.S. Pat. No. 7,413,919 to Qing et al., which is also incorporated by reference in its entirety and for all purposes. Hereinafter, the terms "sensors," "actuators," "sensor/actuators," "sensing elements," "transducers," or the like may be used interchangeably to refer to elements that can carry out detection and/or actuation functions.

Figure 2:
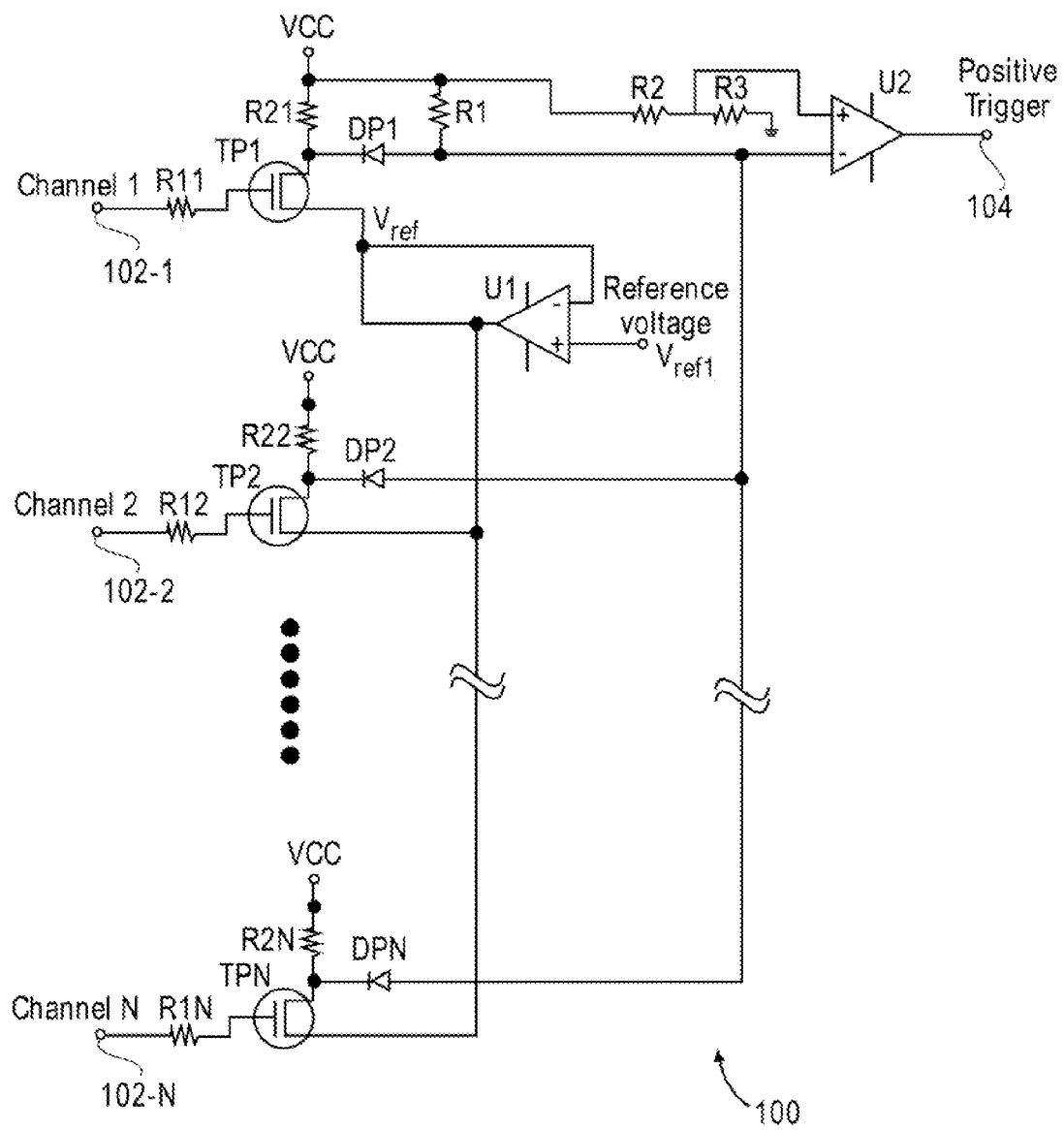
FIG. 2 is a circuit diagram illustrating details of a positive trigger circuit.
Figure 3:
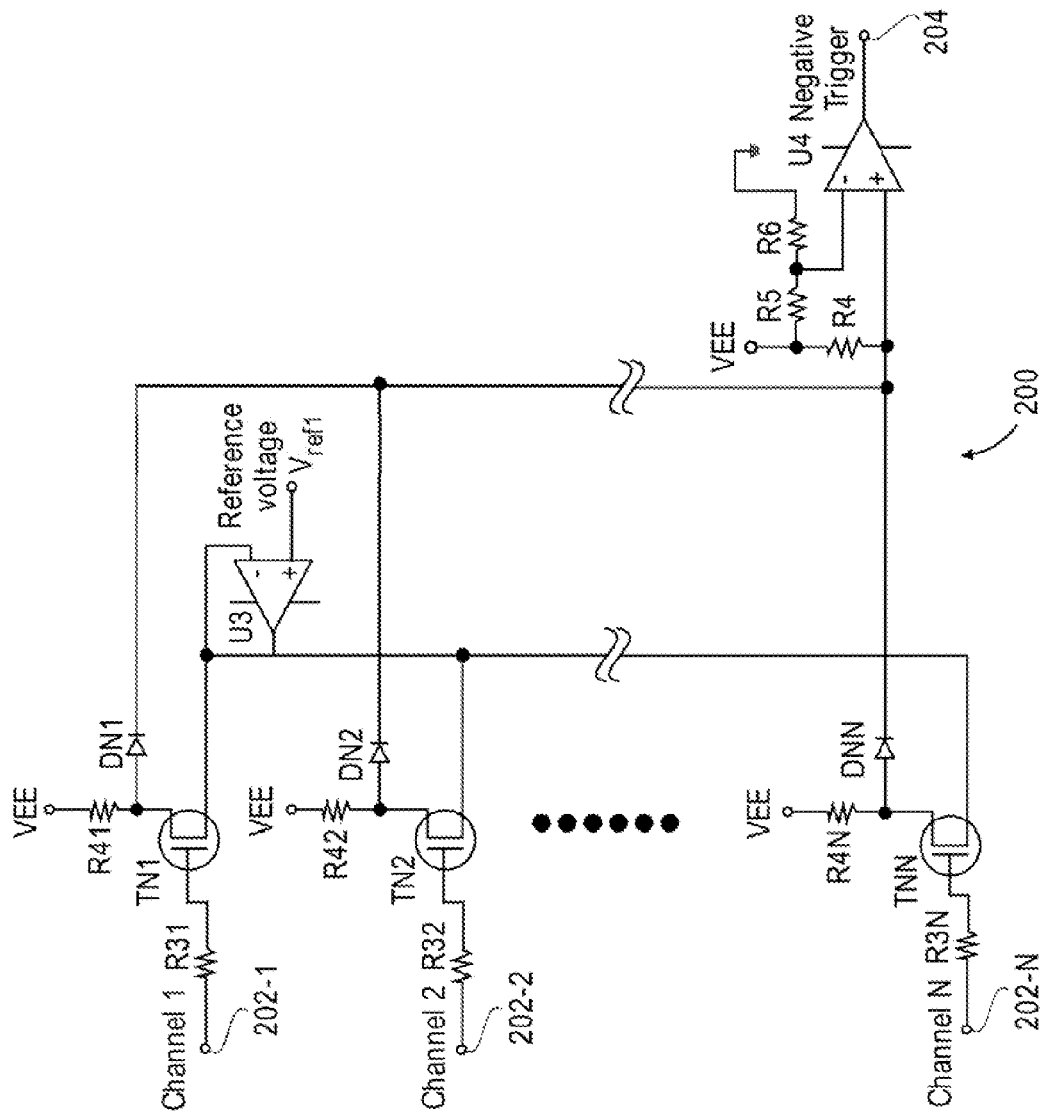
FIG. 3 is a circuit diagram illustrating details of a negative trigger circuit.

The signals generated by the transducers of sensor network 20 are voltage signals that can take on both positive and negative values. The trigger circuit 50 can thus include two circuits, one that triggers from positive voltage signals and one that triggers from negative signals. FIGS. 2 and 3 schematically illustrate respective examples of these two circuits.

FIG. 2 is a circuit diagram illustrating details of a positive trigger circuit. The positive trigger circuit 100 has input terminals 102-1 through 102-N corresponding to channels 1 through N that are monitored by the diagnostic hardware 30, and an output terminal 104. The input terminals 102-1 through 102-N receive signals from the sensors of sensor network 20 and when any one or more of these signals exceeds a predetermined positive voltage threshold, the circuit 100 outputs a positive trigger signal from its output terminal 104. The circuit 100 also has transistors TP1, . . . , TPN, one for each input terminal 102-1 through 102-N. Also included are an operational amplifier U1, comparator U2, and power supply input VCC. Each of the inputs 102-1 through 102-N is in electrical communication with the gate terminal of a corresponding one of the transistors TP1, . . . , TPN, through resistors R11, . . . , R1N, as shown. One terminal of each transistor TP1, . . . , TPN is connected to the output of operational amplifier U1, while the other terminal of each transistor TP1, . . . , TPN is connected to the negative input of comparator U2. That is, the source terminal of each of the transistors receives the reference voltage Vref1 of operational amplifier U1, while the drain terminal transmits this received voltage to the negative input of comparator U2. The power supply VCC applies a voltage to the positive input of comparator U2 through the voltage divider formed by resistors R2 and R3. VCC also applies a voltage to one terminal of each of the transistors TP1 through TPN as shown, so that when the transistors are turned off (i.e., the sensors have not detected any stress waves of concern in the structure), VCC applies a voltage to the negative input of comparator U2 through resistors R21, . . . , R2N. The operational amplifier U1 is configured as a unity gain amplifier, so that a reference voltage Vref1 input to its negative input is also applied to one terminal of each of the transistors TP1 through TPN.

Resistors R2 and R3 act as a voltage divider, and are used to set the voltage level input to the positive input of U2. Thus, for a given value of VCC, the resistances of R2 and R3 are set so that their voltage output to the positive input of U2 is higher than Vref1 minus the voltage drop across one of the transistors TP1, ..., TPN, i.e. typically, (Vref1−0.7). For example, when VCC supplies +5 V, R2 and R3 can have values of 10 kΩ and 100 kΩ, respectively.

In operation, the circuit 100 waits for a signal from one of the sensing elements. Absent such a signal, the transistors TP1 through TPN are each in their off state. The positive input of the comparator U2 thus receives the voltage [R2/(R2+R3)]*VCC, while the negative input of the comparator U2 receives the voltage VCC. The voltage at the positive input of comparator U2 is thus lower than the voltage at its negative input, so the comparator U2 does not emit a trigger signal.

When any of the sensing elements emits a signal with a voltage Vs for which (Vs−Vref1) is greater than the turn-on voltage of its corresponding transistor, that transistor is turned on. As above, the sensing elements emit their signals upon detecting stress waves in the structure, where the magnitudes of the emitted signals increase as the magnitudes of the detected stress waves increase. The sensing elements will thus turn their associated transistors on only when their emitted signals rise to a point at which the difference between their voltage and Vref1 exceeds the turn-on voltage. That is, the transistors TP1 through TPN are only switched on by stress waves above a certain magnitude threshold, where this threshold is effectively set by the value of Vref1.

Once any one or more of the transistors is turned on, the voltage applied to the negative input of comparator U2 becomes Vref1 minus the voltage drop across the transistor Vt, which is typically 0.7 V. In such a case, the voltage at the positive input of comparator U2 would thus remain [R2/(R2+R3)]*VCC, while the voltage at the negative input would become Vref1−Vt. If Vref1 is chosen so that [R2/(R2+R3)]*VCC>Vref1−Vt, the voltage at the positive input of comparator U2 becomes greater than the voltage at its negative input, prompting the comparator U2 to toggle and transmit a trigger signal.

As the comparator U2 toggles based on the relative difference between VCC and Vref1, both VCC and Vref1 can be thought of as reference voltages, where a different one of the reference voltages is applied to the negative terminal of U2 depending on whether the sensing elements emit a signal of a predetermined strength, i.e. whether the sensors detect a stress wave of sufficient magnitude. When the circuit 100 switches from applying one reference voltage upon the negative terminal of U2 to applying the other, U2 toggles its state and transmits its trigger signal.

In the circuit of FIG. 2, the turn-on voltage of a transistor TP1, ..., TPN is a difference between its gate voltage and Vref1, the voltage output from the operational amplifier U1. The threshold voltage at which each transistor TP1, ..., TPN is turned on is thus governed by Vref1. The reference voltage Vref1 can thus be set so as to effectively make the trigger circuit 100 more or less sensitive to the output of the sensing elements, as desired. More specifically, larger values of Vref1 will require larger signals input to terminals 102-1, ..., 102-N in order to trigger the circuit 100, while smaller values of Vref1 will require smaller input signals. The invention contemplates any suitable value for reference voltage Vref1. For example, in an application in which transistors TP1, ..., TPN have turn-on voltages of 1.2 V, Vref1 can be set at approximately +0.5 V. The resistances R1, R21, ..., R2N, and R11, ..., R1N are to ensure the application of VCC and the sensor signals to the correct terminals, and can have any suitable values.

In this manner, the reference voltage Vref1 acts to determine the threshold value at which the voltage signal from the sensing elements triggers the circuit 100 to emit its trigger signal. That is, this threshold value can be set to a desired level by adjusting Vref1. The invention thus contemplates software and/or hardware allowing the user to set Vref1 at a desired level, either via processor 40 or any other suitable device. Hardware and software for setting a voltage are known, and the invention contemplates any suitable system for accomplishing this.

The circuit 100 of FIG. 2 confers several distinct advantages. First, the circuit 100 consumes little power, while still providing real-time monitoring of a structure and alerting of an event. More specifically, in addition to the power savings realized by allowing the system 10 to enter a sleep mode, the circuit 100 itself consumes very little power. In particular, the transistors TP1, ..., TPN can be N-channel enhancement mode field effect transistors which consume little power, allowing the overall circuit 100 to operate on very little power. For example, a single such transistor can consume less than 1 mW of power. The use of N-channel enhancement mode field effect transistors has the added advantage of preventing distortion of the signals from sensor network 20 as the gate resistance of each such transistor is extremely large, and thus largely prevents the transistors from drawing any current from the sensor signals.

Second, the design of circuit 100 is readily scalable, so that adding further input channels requires simply adding new transistors. In particular, note that a single operational amplifier U1 provides the reference voltage to every transistor, and a single comparator U2 monitors every single transistor. Thus, new channels/transistors can be added without adding additional reference voltages or comparators, so that the number of channels monitored by circuit 100 can be increased as desired, with almost no corresponding increase in power consumption. Additionally, transistors TP1, ..., TPN are turned off when no impact (or other notable structural event) occurs, cutting off much of the power consumed by circuit 100.

Third, the use of transistors TP1, ..., TPN allows for rapid response time, with the circuit 100 emitting its trigger signal in a very short time. For example, it has been found that a trigger circuit configured as above can emit its trigger signal within 1 μs of receiving a signal from one of the sensing elements of sensor network 20. This can translate to a wake-up time for system 10 of 0.1 ms or less. This short wake-up time often allows the system 10 to wake up sufficiently quickly to analyze and diagnose the same event(s) that prompted the system 10 to wake up, rather than having to wait for another event to occur. This in turn allows for structural health monitoring systems that consume less power while still being capable of rapidly and accurately diagnosing the health of structures.

Fourth, as any transistor TP1, ..., TPN can trigger the circuit 100, the design of circuit 100 effectively allows for the simultaneous and continuous monitoring of a large number of sensing elements. Furthermore, as the transistors TP1, ..., TPN act simply as switches, the circuit 100 monitors its sensing elements passively, without requiring power to actively query the structure or to transmit any signals to the sensing elements.

Attention now turns to the negative trigger circuit of trigger circuit 50. FIG. 3 is a circuit diagram illustrating details of this negative trigger circuit. In FIG. 3, negative trigger circuit 200 has input terminals 202-1, ..., 202-N, each input terminal connected to one of the sensing elements of sensor network 20 and corresponding to one of the input channels 1-N. The circuit 200 also has an output terminal 204 that transmits a high signal, or trigger signal, when the circuit 200 detects a sufficiently large signal from any one or more of the sensing elements. When no signal is detected, the output terminal 204 is in a low state. The trigger signal serves to wake up the diagnostic hardware 30, host processor 40, and/or any other devices or hardware placed into low-power sleep mode.

The negative trigger circuit 200 also has an operational amplifier U3 and comparator U4. The operational amplifier U3 is configured as a unity gain amplifier, receiving a reference voltage Vref2 at its positive input and outputting Vref2 at its output terminal. Transistors TN1, ..., TNN have their gate terminals connected to the input terminals 202-1, ..., 202-N of the circuit 200 through resistors R31-R3N. The source terminal of each transistor TN1, ..., TNN is connected to the common output of operational amplifier U3, and the drain terminals are each connected to negative source voltage VEE through resistors R41-R4N, as well as to the positive input of comparator U4 (via diodes DN1-DNN). Negative source voltage VEE is also applied to the negative input of comparator U4 through the voltage divider made up of resistors R5 and R6. This VEE terminal is also connected to the positive terminal of comparator U4 through resistor R4.

In operation, a negative reference voltage Vref2 is applied to operational amplifier U3, and thus to each of the transistors TN1, ..., TNN. Absent a signal from one of the sensing elements, each of the transistors TN1, ..., TNN is turned off, so that VEE is applied to the positive input of comparator U4, while [R5/(R5+R6)]*VEE is applied to the negative input of comparator U4. As VEE<[R5/(R5+R6)]*VEE, the circuit 200 comparator U2 does not emit its trigger signal, and circuit 200 is in its off state.

When any of the sensing elements emits a signal with a negative voltage Vs for which |Vs−Vref2| is greater than the turn-on voltage of its corresponding transistor, that transistor is turned on. Once any one or more of the transistors is turned on, the voltage applied to the positive input of comparator U4 becomes Vref2 less the voltage drop across the transistor Vt, which as above is typically 0.7 V. In such a case, the voltage at the negative input of comparator U2 would thus remain [R5/(R5+R6)]*VEE, while the voltage at the positive input would become Vref2+Vt. If the negative reference voltage Vref2 is chosen so that [R5/(R5+R6)]*VEE<Vref2+Vt, the voltage at the negative input of comparator U4 becomes less (i.e. more negative) than the voltage at its positive input, prompting the comparator U4 to toggle, and transmit its trigger signal.

As the comparator U4 toggles based on the relative difference between VEE and Vref2, both VEE and Vref2 can be thought of as reference voltages, where the reference voltage applied to the positive terminal of U4 depends on whether the sensing elements emit a signal of a predetermined strength, i.e. whether the sensors detect a stress wave of sufficient magnitude. When the circuit 200 switches from applying one reference voltage to the positive terminal of U4 to applying the other, U4 toggles its state and transmits its trigger signal.

In some applications, VEE can be −5 V, while the resistances R5 and R6 can be 10 kΩ and 100 kΩ, respectively. However, the invention encompasses any suitable values for VEE, R5, and R6. The invention also contemplates any suitable value for reference voltage Vref2. For example, in an application in which transistors TN1, ..., TNN have turn-on voltages of −1.2 V, Vref2 can be set at approximately −0.5 V. Additionally, while any suitable transistors TN1, ..., TNN can be employed, P-channel logic level enhancement mode field effect transistors have been found to be desirable in at least some applications. The resistances R4, R31, ..., R3N, and R41, ..., R4N are to ensure the application of VCC and the sensor signals to the correct terminals, and can have any suitable values.

The layout of negative trigger circuit 200 is similar in many respects to that of positive trigger circuit 100. Accordingly, one of ordinary skill in the art will realize that the circuit 200 possesses many of the same advantages. In particular, the circuit 200 is readily scalable, while also consuming little power and having a rapid response time (e.g., less than 1 μs). The circuit 200 is also capable of effectively monitoring many different sensing elements simultaneously, and waking up a structural health monitoring system 10 upon detection of a stress wave above a certain magnitude.

The trigger circuit 50 can combine both circuits 100 and 200, so that the system 10 is awoken from sleep mode upon detection of either a sufficiently large negative or positive signal from any sensor. In this configuration, the inputs 102-1, ..., 102-N and 202-1, ..., 202-N are both connected to the sensor network 20, with corresponding inputs of the positive trigger circuit 100 and negative trigger circuit 200 connected to the same sensor or sensors. That is, 102-1 and 202-1 are both connected to the same sensor(s), 102-2 and 202-2 are both connected to the same sensor(s), and so on. In this manner, a sufficiently large positive or negative signal from any sensing element will cause one of the circuits 100, 200 to emit its trigger signal.

Figure 4:
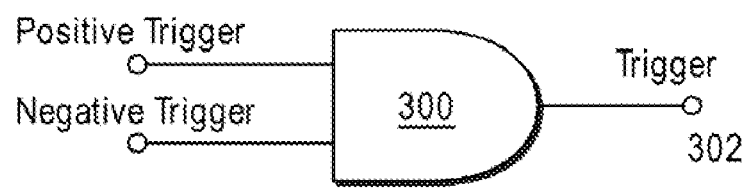
FIG. 4 illustrates a logic block used to combine the outputs of the positive and negative trigger circuits.

The trigger signals output from circuits 100, 200 can be sent to the host processor 40 (or another device) separately, or they may be combined so that a single trigger signal is sent. It is often not necessary to discriminate between negative and positive sensor signals when deciding whether to wake a system 10 up. Thus, a logic gate or other combining element may be used to send a single trigger signal when either one of the circuits 100, 200 is triggered. FIG. 4 illustrates one such element. Here, logic gate 300 may be connected between the circuits 100, 200 and the host processor 40, with the output terminal 104 connected to one input of logic gate 300, the output terminal 204 connected to the other input of logic gate 300, and the output 302 transmitting its trigger signal to processor 40. The logic gate 300 is configured as an OR gate, so that its trigger signal is transmitted from output 302 when either one or both of the circuits 100, 200 is triggered. Thus, when both circuits 100, 200 are at their low level output, the logic gate 300 is also at its low level output, and when either one or both of the circuits 100, 200 toggles to its high level output, the logic gate 300 also toggles to its high level output. One of ordinary skill in the art will understand that the invention is not limited strictly to use of an OR logic gate. That is, logic gate 300 is merely a representation of the logical OR function, and can be implemented by any hardware and/or software as appropriate.

Figure 5:
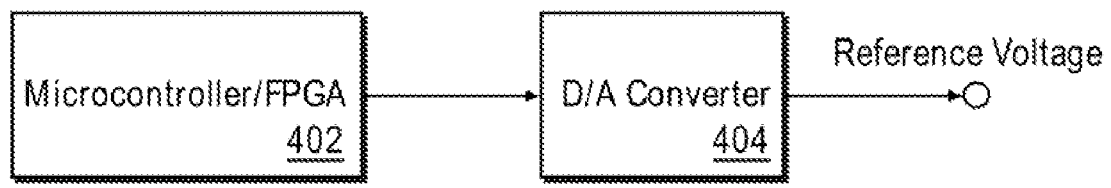
FIG. 5 is a block diagram representation of components for generating a reference voltage for use in the positive and negative trigger circuits.

As described above, the invention also contemplates adjustable reference voltages Vref1, Vref2. The invention also contemplates the possibility of different values for Vref1 and Vref2, i.e. |Vref1| need not be equal to |Vref2|. Adjustment of these reference voltages can be accomplished in any manner. As one example, FIG. 5 is a block diagram representation of components for generating a reference voltage for use in the positive and negative trigger circuits 100, 200. Here, a controller 402 (which can be any controller, such as a microcontroller or FPGA) is configured to receive voltage level commands from a user, and to output these voltage levels as digital signals to D/A converter 404. The D/A converter 404 then converts these digital signals to an analog voltage to be used as the reference voltage. This analog output is then transmitted to operational amplifiers U1, U3, to act as their reference voltages. As shown, the controller 402 and D/A converter 404 can each have a single output, so that a single reference voltage is sent to both U1 and U3. Alternatively, the controller 402 can send two voltage signals to D/A converter 404, which in turn can have two outputs, one for Vref1 and one for Vref2. The controller 402 can thus set Vref1 and Vref2 independently, and to different values, so that the sensitivity of each trigger circuit 100, 200 can be independently adjusted as desired. The microcontroller 402 and D/A converter 404 can be components of host processor 40, or can be separate components of another device or system.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, embodiments of the invention include circuits 100, 200 that employ any number of channels, i.e. any number of transistors TP1, . . . , TPN and TN1, . . . , TNN. The invention also encompasses any value or values for reference voltages Vref1, Vref2, and includes embodiments in which these reference voltages are adjustable, either manually or by components configured such as in FIG. 5. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A structural health monitoring system, comprising:
    a structural health monitoring system operable to monitor a structure to detect stress waves propagating in the structure, the structural health monitoring system comprising:
        a plurality of sensing elements operable to generate signals corresponding to the detected stress waves, wherein one or more of the sensing elements are additionally operable to actuate so as to generate the stress waves propagating in the structure; and
        a processor programmed with an operational mode and a sleep mode, the processor operable in the operational mode to receive sensor signals corresponding to the signals generated by the sensing elements, and to perform at least one of processing the sensor signals and storing the sensor signals; and
    a trigger circuit connected between the plurality of sensing elements and the processor, the trigger circuit operable to receive the signals generated by the plurality of sensing elements, and to transmit a wake signal to the processor in response to receiving one of the signals with a voltage having a magnitude greater than a predetermined threshold;
    wherein the processor is further operable to enter the operational mode from the sleep mode upon receiving the wake signal.

2. The system of claim 1, wherein the trigger circuit further comprises:
    an amplifier having an input receiving a reference voltage, and an output;
    a comparator having first and second inputs and an output, the first input in electrical communication with a power supply voltage; and
    a plurality of transistors each having first and second terminals, a gate terminal, and a voltage drop between the first and second terminals when the transistor is in the on state;
    wherein the first terminal of each of the transistors is in electrical communication with the output of the amplifier;
    wherein the gate terminals are in electrical communication with respective ones of the sensing elements so as to receive voltages corresponding to the signals generated by the respective ones of the sensing elements; and
    wherein the second terminals are each in electrical communication with the second input of the comparator.

3. The system of claim 2:
    wherein a magnitude of the reference voltage minus a voltage drop across one of the transistors is greater than a magnitude of a voltage applied to the first input of the comparator from the power supply;
    wherein when a magnitude of the signals generated by any one of the sensing elements minus a magnitude of the reference voltage does not exceed a turn on voltage of the corresponding one of the transistors, the comparator generates a first voltage at its output;
    wherein when a magnitude of the signals generated by any one of the sensing elements minus a magnitude of the reference voltage exceeds a turn on voltage of the corresponding one of the transistors, the comparator generates a second voltage at its output; and
    wherein, for each of the transistors, the predetermined threshold is substantially equal to the magnitude of the reference voltage plus the corresponding turn on voltage.

4. The system of claim 3, wherein the second voltage is the wake signal.

5. The system of claim 3, wherein the reference voltage is a positive voltage, and the power supply voltage is a positive voltage.

6. The system of claim 2, wherein the trigger circuit is a first trigger circuit, and wherein the system further includes a second trigger circuit, the second trigger circuit comprising:
    an amplifier having an input receiving a reference voltage, and an output;
    a comparator having first and second inputs and an output, the first input in electrical communication with a power supply voltage; and
    a plurality of transistors each having first and second terminals, a gate terminal, and a voltage drop between the first and second terminals when the transistor is in the on state;
    wherein the first terminal of each of the transistors is in electrical communication with the output of the amplifier;
    wherein the gate terminals are in electrical communication with respective ones of the sensing elements so as to receive voltages corresponding to the signals generated by the respective ones of the sensing elements; and
    wherein the second terminals are each in electrical communication with the second input of the comparator.

7. The system of claim 6 wherein, for the second trigger circuit:
    a magnitude of the reference voltage minus a voltage drop across one of the transistors is greater than a magnitude of a voltage applied to the first input of the comparator from the power supply;
    when a magnitude of the signals generated by any one of the sensing elements minus a magnitude of the reference voltage does not exceed a turn on voltage of the corresponding one of the transistors, the comparator generates a first voltage at its output; and
    when a magnitude of the signals generated by any one of the sensing elements minus a magnitude of the reference voltage exceeds a turn on voltage of the corresponding one of the transistors, the comparator generates a second voltage at its output;
    wherein, for each of the transistors, the predetermined threshold is substantially equal to the magnitude of the reference voltage plus the corresponding turn on voltage.

8. The system of claim 7, wherein the second voltage is the wake signal.

9. The system of claim 7, wherein the reference voltage is a negative voltage, and the power supply voltage is a negative voltage.

10. A trigger circuit for changing modes in a structural health monitoring system, the circuit comprising:
- a circuit having a plurality of inputs and an output, the circuit operable to simultaneously monitor each of the inputs for an input signal received from a structural health monitoring sensing element, wherein the input signal is indicative of a stress wave propagating in a structure, and the structural health monitoring sensing element is operable to sense, or actuate and generate, the stress wave propagating in the structure, and
- wherein the circuit is further operable to transmit a wake up signal from the output when a voltage of the input signal exceeds a predetermined threshold, wherein the wake up signal is operable to initiate a wake up process in the structural health monitoring system.

11. The trigger circuit of claim 10, wherein the circuit further comprises:
- a first circuit having a first set of the plurality of inputs, a first voltage source configured to provide a first reference voltage, a second voltage source configured to provide a second reference voltage, and a first comparator having first and second inputs and an output;
- wherein the second voltage source is in electrical communication with the second input of the first comparator, so that the second reference voltage is applied to the second input of the first comparator;
- wherein the first voltage source is in selective electrical communication with the first input of the first comparator, so that the first reference voltage is applied to the first input of the first comparator when one or more of the input signals having a voltage exceeding the predetermined threshold is received by any one or more of the first set of the plurality of inputs; and
- wherein the first comparator applies a first trigger signal to its output when the first reference voltage is applied to the first input of the first comparator.

12. The trigger circuit of claim 11, wherein:
- the first circuit further comprises a plurality of transistors each having first and second terminals and a gate terminal;
- the first voltage source is an operational amplifier having an output in electrical communication with each of the first terminals of the transistors;
- each input of the first set of the plurality of inputs is electrically connected to a respective one of the gate terminals of the transistors; and
- each of the second terminals of the transistors is electrically connected to the first input of the first comparator, so that when a difference between a voltage of the input signal and a voltage of the output of the operational amplifier exceeds a turn on voltage of the corresponding transistor, the first reference voltage is applied to the first terminal of the first comparator.

13. The trigger circuit of claim 12, wherein the second reference voltage is greater than the first reference voltage.

14. The trigger circuit of claim 11, wherein the circuit further comprises:
- a second circuit having a second set of the plurality of inputs, a third voltage source configured to provide a third reference voltage, a fourth voltage source configured to provide a fourth reference voltage, and a second comparator having first and second inputs and an output;
- wherein the fourth voltage source is in electrical communication with the second input of the second comparator, so that the fourth reference voltage is applied to the second input of the second comparator;
- wherein the third voltage source is in selective electrical communication with the first input of the second comparator, so that the third reference voltage is applied to the first input of the second comparator when one or more of the input signals having a voltage exceeding the predetermined threshold is received by any one or more of the second set of the plurality of inputs; and
- wherein the second comparator applies a second trigger signal to its output when the third reference voltage is applied to the first input of the second comparator.

15. The trigger circuit of claim 14, wherein:
- the second circuit further comprises a plurality of transistors each having first and second terminals and a gate terminal;
- the third voltage source is an operational amplifier having an output in electrical communication with each of the first terminals of the transistors of the second circuit;
- each input of the first set of the plurality of inputs is electrically connected to a respective one of the gate terminals of the transistors of the second circuit; and
- each of the second terminals of the transistors of the second circuit is electrically connected to the first input of the second comparator, so that when a difference between a voltage of the input signal and a voltage of the operational amplifier of the second circuit exceeds a turn on voltage of the corresponding transistor, the third reference voltage is applied to the first terminal of the second comparator.

16. The trigger circuit of claim 15, wherein the third reference voltage is greater than the fourth reference voltage.

17. The trigger circuit of claim 14, further comprising:
- a logic gate having at least two inputs and an output, wherein the output of the first comparator is electrically connected to one input of the logic gate and the output of the second comparator is electrically connected to another input of the logic gate, and wherein the logic gate applies the wake up signal to its output upon receiving either the first trigger signal or the second trigger signal.

18. The trigger circuit of claim 10:
- wherein the inputs of the circuit are in electrical communication with the sensing elements and the output of the circuit is in electrical communication with an analyzer of a structural health monitoring system; and
- wherein the sensing elements are operable to generate the input signal in response to stress waves detected in a structure, and to transmit the input signal both to the analyzer for determination of a health of the structure, and to the circuit.

19. The trigger circuit of claim 18, wherein:
- the analyzer has a wake mode and a sleep mode;
- the analyzer is operable to carry out the determination of the health of the structure in wake mode, and the analyzer generally consumes less power in sleep mode than in wake mode; and
- wherein the analyzer switches from the sleep mode to the wake mode upon receiving the wake up signal from the output of the circuit.

* * * * *